United States Patent [19]

Byrne et al.

[11] 4,245,756

[45] Jan. 20, 1981

[54] ARTICLE DISPENSING AND POSITIONING DEVICE

[76] Inventors: LeRoy H. Byrne, 45 Horseshoe Dr., Waterbury, Conn. 06706; Arnold Fassman, 40 Oak St., Westport, Conn. 06880; Thomas L. Simmel, 44 Booras, Milford, Conn. 06460

[21] Appl. No.: 16,501

[22] Filed: Mar. 1, 1979

[51] Int. Cl.³ .......................................... B65G 59/06
[52] U.S. Cl. .................................. 221/185; 221/274; 221/275; 221/303; 273/144 A; 46/1 R; 46/40
[58] Field of Search ............... 221/185, 268, 272, 273, 221/274, 275, 174, 175, 176, 247, 248, 303, 250; 273/149 R, 144 A, 148 R; 46/1 R, 40

[56] References Cited

U.S. PATENT DOCUMENTS

| 3,315,404 | 4/1967 | Rosen | 46/1 R |
| 3,828,970 | 8/1974 | Yamamoto | 46/40 |

FOREIGN PATENT DOCUMENTS

658583 10/1951 United Kingdom ..................... 221/185

*Primary Examiner*—Allen N. Knowles
*Attorney, Agent, or Firm*—Martin D. Wittstein

[57] ABSTRACT

A device for dispensing a plurality of rectangular objects and depositing the objects on a surface in uniformly spaced relationship with the objects standing upright on a short edge, more particularly, a device for setting up dominos in a row so that the dominos can be knocked down sequentially. The device includes a wheel supported body which supports an upstanding supply chamber for storing stacked dominos, and an ejecting assembly at the bottom of the supply chamber which ejects the bottom most domino toward the rear of the body as the body rolls across a surface. The ejecting assembly moves each domino into engagement with a top and side guide assembly which cooperates with the ejecting assembly to cause the domino to be deposited on the supporting surface and stabilized thereon in a stationary position before the device moves away from the domino so that the domino remains upright and does not fall.

14 Claims, 6 Drawing Figures

ARTICLE DISPENSING AND POSITIONING DEVICE

BACKGROUND OF THE INVENTION

Most everyone is familiar with the well known recreational activity of setting up dominos in a row in closely spaced relationship, and then knocking them down by pushing over the first domino of the row which in turn pushes over the second, and so on, until all of the dominos have fallen. In order to cause all of the dominos in the row to fall, it is necessary that they be spaced apart a distance such that each domino will cause the succeeding domino in the row to tip to the point where it will freely fall because the center of mass of the domino is moved beyond a point of stability. Thus, by so spacing the dominos each one will push over the adjacent succeeding domino in the row and they all fall as in a continuous wave of falling dominos, much to the delight of children and oftentimes adults also.

The spacing between the dominos will vary depending on whether the dominos are set up to reset on a short or a long edge, although almost invariably they are set up on a short edge. The spacing can still vary within a range in relation to the length of the dominos which is approximately one third to two thirds the length of the dominos.

In more recent years, the pasttime activity of setting up a few dozen dominos in a row and knocking them over has grown into the adult sport of setting up many hundreds or thousands of dominos in a very complex pattern or rows, curves, cross-overs, etc., such that each domino will still contact an adjacent domino and push it over regardless of the shape of the pattern which is set up. Some of these patterns, as recently seen on television shows, are so enormous and complex that tens of thousands of dominos are set up in patterns so intricate that it requires many days to set up the pattern and twenty to thirty minutes for all of the dominos to fall.

Prior to the present invention, it has been necessary to set up the dominos manually and to do so one domino at a time. It will be readily understood that it is a very time consuming process to set up a complex pattern of hundreds or thousands of dominos for the reason that each domino is being set up on its short or least stable edge and therefore each domino must be handled with great care in order to avoid inadvertently knocking over the domino while it is being set up. Obviously the consequence of inadvertently knocking over the domino is that the entire pattern will be prematurely knocked down. Also, considerable care and attention must be devoted to preventing the inadvertent knocking over of any domino already set up in the pattern since the same frustrating consequence will result. As briefly mentioned above, some of the extremely complicated patterns which have been seen on television have taken several days to set up, even under carefully controlled environmental conditions, because of the time that is required to manually set up each domino on its short edge with the proper spacing from the adjacent domino and with sufficient stability to assure that the domino will stay in the upright position when the person setting up the domino releases his grasp.

BRIEF SUMMARY OF THE INVENTION

The present invention provides, for the first time, a device for automatically setting up dominos as above described.

Generally speaking, the present invention relates broadly to the field of article dispensing devices, and more particularly to a device which dispenses and deposits on a surface a plurality of objects evenly spaced from one another.

The present invention solves the problems discussed above which are encountered when setting up dominos manually and the principles of the invention may be incorporated into other devices for setting up articles where it is desired, for whatever reason, to have a plurality of evenly spaced articles arranged in a row.

The present invention comprises generally a body member and means such as wheels supporting the body member for movement along a surface on which the objects are to be placed. A supply hopper is mounted on the body member for holding a plurality of articles. The body member includes a discharge chamber which is in communication with one end of the supply hopper such that objects in the supply hopper can move successively into the discharge chamber. The next object up rests on an ejector means which is mounted in the body member for reciprocatory movement through the discharge chamber such that the ejector discharges an object from the discharge chamber. The device further includes a means which is responsive to movement of the body member along the surface for actuating the ejector means in its reciprocatory movement so that objects are successively dispensed and positioned on the surface.

In some of its more limited aspects, the supply hopper is preferably elongate and projects upwardly from the body member so that objects are stacked therein in longitudinally vertical orientation and fall by gravity into the discharge chamber, which is located directly beneath the supply hopper.

The ejector actuating means is preferably a suitable drive connection between at least one of the wheels and the ejector means so that the ejector means is caused to move in response to rotation of the wheel caused by the body member being moved across the surface. In one embodiment of the invention, the drive connection between the wheel and the ejector means is constructed and arranged such that the ejector means travels through the discharge chamber with a harmonic motion, but moves the object into engagement with a rotating top roller guide which has a linear surface speed equal to that of the body member and which stabilizes the object and assures that it is stationary with respect to the supporting surface, thereby substantially eliminating any tendency of the object to fall after the device moves away from the object.

In another embodiment, the drive connection causes the ejector means, when moving in the ejecting direction through the discharge chamber, to move with a zero velocity relative to the supporting surface over which the body member is moving, with the result that the object is also moving at a zero velocity relative to the supporting surface.

The invention includes the top roller guide already mentioned and a side discharge guide, both of which cooperate with the ejector means to maintain the object being dispensed in an upright and stable condition and to prevent it from being moved to an undesirable position. These guides may be stationary, but are preferably movable, being moved either by the object being dispensed against a spring bias or being positively driven from one of the supporting wheels, or a combination of both.

Having briefly described the general nature and construction of the present invention, it is a principal object thereof to provide a device for dispensing a plurality of objects and depositing them on a surface in a row and evenly spaced from one another.

It is another object of the present invention to provide a device for dispensing a plurality of rectangular objects such as dominos in a row in response to the device being moved across a surface, the objects being deposited in evenly spaced relationship and standing upright on their short edge.

It is another object of the present invention to provide a device for dispensing and positioning a plurality of objects such as dominos by discharging the objects from one side of a body member as the body member moves away from the location where the object is to be positioned, the object being deposited on the supporting surface with a zero velocity with respect thereto and stabilized thereon before the device moves away from the object.

It is still another object of the present invention to provide a device for dispensing a plurality of rectangular objects such as dominos in a row in response to the device being moved across a surface in which suitable discharge guides provide sufficient stability to the objects so as to assure that each object remains upright and in the precise position in which it is placed after the dispensing and depositing operation is complete.

These and other objects and advantages of the present invention will be more readily apparent from an understanding of the following detailed description of presently preferred embodiments of the invention when considered in conjunction with the accompanying drawings in which:

DETAILED DESCRIPTION OF THE INVENTION

Figure 1:
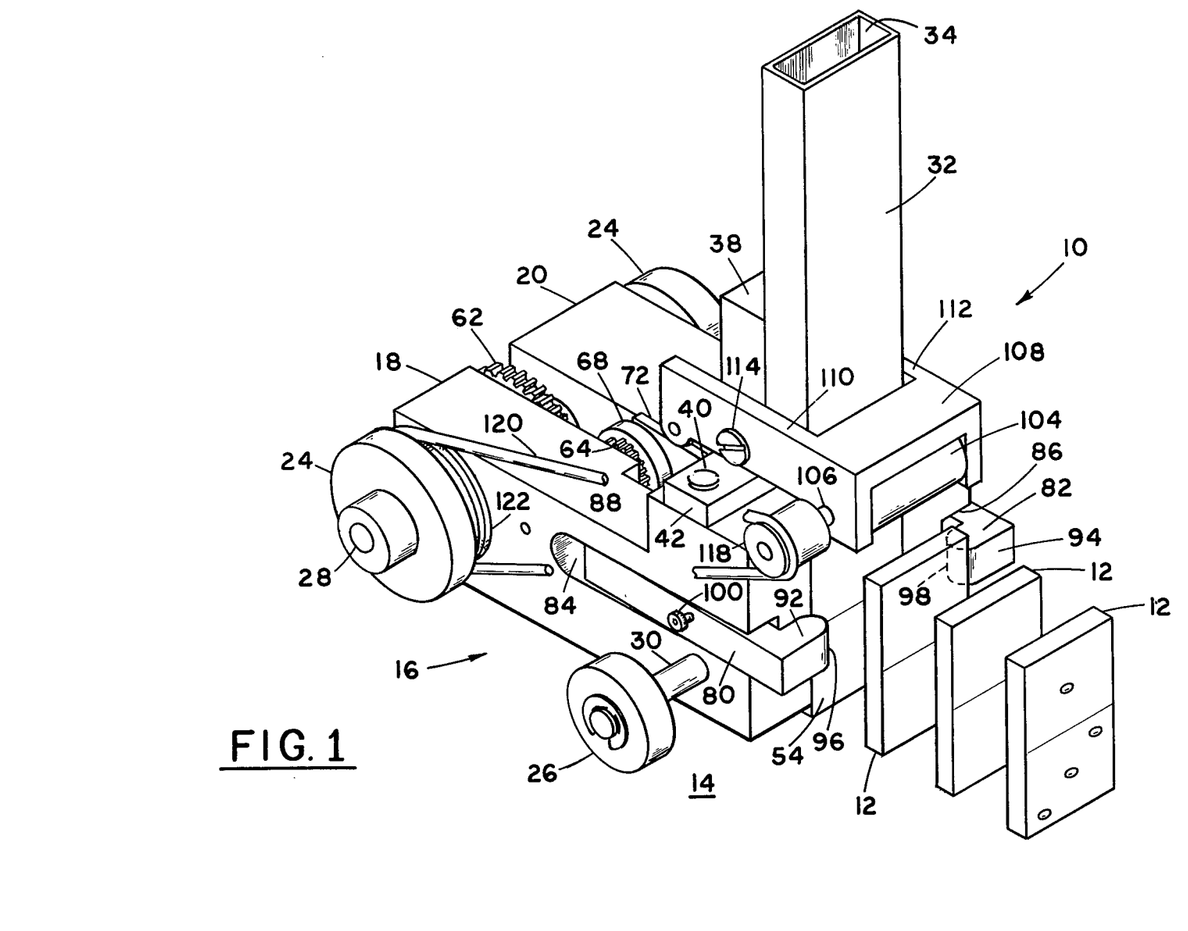
FIG. 1 is a perspective view of a device embodying the principles of the invention showing three objects already dispensed and positioned on the surface and one object still in the discharge chamber of the device.

Referring now to the drawings, and particularly to FIG. 1 thereof, there is seen a device generally designated by the numeral 10 for dispensing and positioning a plurality of rectangular objects such as the dominos 12 on a flat surface 14 in evenly spaced relationship. The device 10 includes a body member generally designated by the numeral 16 which, in the embodiment illustrated, comprises two half sections 18 and 20 which are joined together in any suitable manner such as the bar 22 (FIG. 5) which spans the underside of the body member 16.

The body member 16 is supported for movement across the surface 14 by a plurality of wheels, specifically in the illustrated embodiment a pair of front wheels 24 and a pair of rear wheels 26. The wheels 24 are designated the front wheels simply because they represent the direction of movement of the device 10 when it is operating as will be more fully seen hereinafter. The front wheels 24 are suitably mounted on an axle 28 which extends through the body member 16 and which is rotatably mounted therein, while the rear wheels 26 are rotatably mounted on a pair of stub shafts 30 which project outwardly from the body member 16. Other arrangements for movably mounting the body member 16 are contemplated within the invention, including merely skids, the wheels being preferred for smoothness of operation and as being the most convenient way of providing a connecting point for the ejector actuating means described below.

A supply hopper 32 is mounted on the body member 16 to store a supply of objects to be dispensed and positioned. Although it is contemplated within the invention to have the supply hopper 32 mounted in a horizontal orientation with some form of discharge assistant to move the dominos toward the discharge end of the supply hopper, it is nevertheless preferred to mount the supply hopper in a vertical orientation as shown in the figures so that the objects can be stacked on the surface thereof on which they will be dispensed and to rely simply on gravity to feed successive objects from the supply hopper to the discharge chamber described below. Accordingly, the supply hopper 32 is shaped to closely fit the objects to be dispensed and has an opening 34 at the top through which objects are loaded into the supply hopper 32. The supply hopper can be made to extent to any convenient height. The bottom 36 (FIG. 5) of the supply hopper is also open and rests on a rear portion of the two half sections 18 and 20 of the body member (FIG. 4) and is secured to the body member in vertical relationship by any suitable means such as by being adhesively secured to a block 38 which is connected to each half of the body member as by the screws 40 (FIG. 2) passing through lateral extensions 42 of the block 38. It will be appreciated that the block 38 and the lateral extensions 42, together with the bar 22 on the bottom of the body member, cooperate to rigidly secure the two halves 18 and 20 of the body member 16 together.

Figure 4:
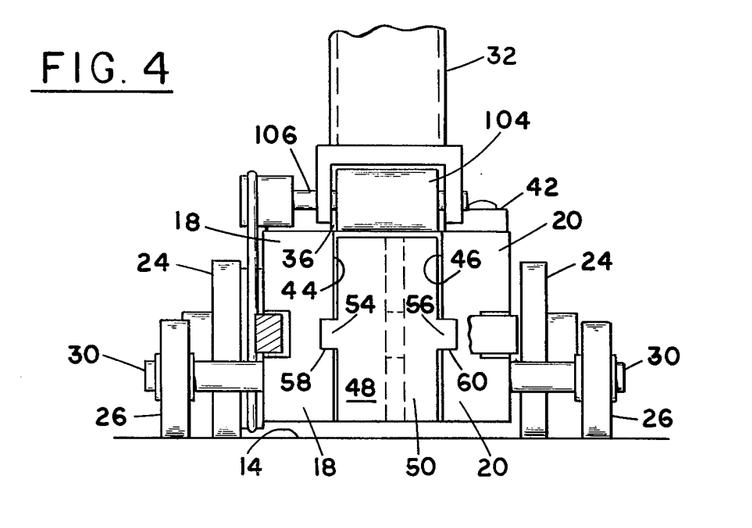
FIG. 4 is a rear view of the device shown in FIG. 1 looking toward the ejector means.
Figure 5:
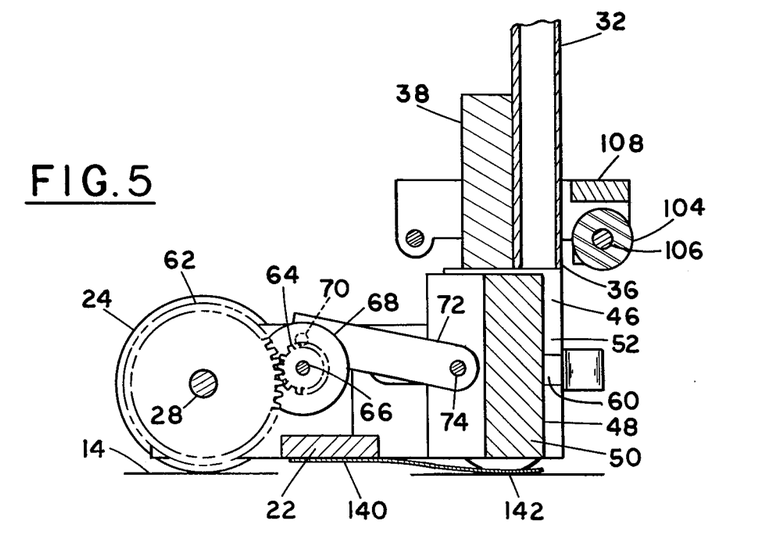
FIG. 5 is a sectional view taken on the line 5—5 in FIG. 2 showing details of the drive connection between the wheels and the ejector means and also an optional floor for the discharge chamber.

As best seen in FIGS. 4 and 5, the bottom 36 of the supply hopper 32 abuts the supper surface of the body member halves 18 and 20. There is a space beneath the bottom 36 of the supply hopper 32 and the supporting surface 14 which is defined laterally by opposed, inwardly facing walls 44 and 46 on the body member halves 18 and 20 respectively, and is defined forwardly by the face 48 of the ejector 50 more fully described below, but which in FIG. 5 is seen to occupy about one half of the space being described. This space, designated in FIG. 5 by the numeral 52, constitutes a discharge chamber located within the body member 16 and beneath and in communication with the supply hopper 32 and from which objects are discharged rearwardly of the body member 16 as seen in FIG. 1, wherein the left-most object designated by the numeral 54 is shown within the discharge chamber just prior to being dispensed therefrom.

The ejector 50 mentioned briefly above comprises a block which, as best seen in FIG. 4, is dimensioned longitudinally and laterally so as to occupy substantially all of the discharge chamber and define the face or wall 48 which ejects the objects 12 from the discharge chamber. The ejector 50 also has lateral extentions 54 and 56 which project outwardly from the opposite sides of the ejector and which are adapted to ride in grooves 58 and 60 formed in the inner opposed walls 44 and 46 of the body member halves 18 and 20 respectively. Thus the lateral extensions 54 and 56 riding in the grooves 58 and 60 provide a smooth sliding support for the ejector 50 so that it can move back and forth within the body member and move through the discharge chamber 52 with each stroke.

The ejector 50 is actuated to reciprocate within the body member and the discharge chamber by any suitable means which contacts the surface over which the device 10 is moved so that the movement of the actuator is responsive to the movement of the device 10. In this manner the spacing between the objects 12 will always be the same regardless of the speed at which the device 10 is moved because the ejector 50 will operate at a rate which is directly dependent upon the velocity of the device 10. While it is within the principles of the invention to have an indpendent means contacting the supporting surface for the sole purpose of driving the actuator, it is convenient and desirable, in the embodiment of the invention disclosed, to use one of the supporting wheels as the starting point for the ejector actuating means.

Figure 2:
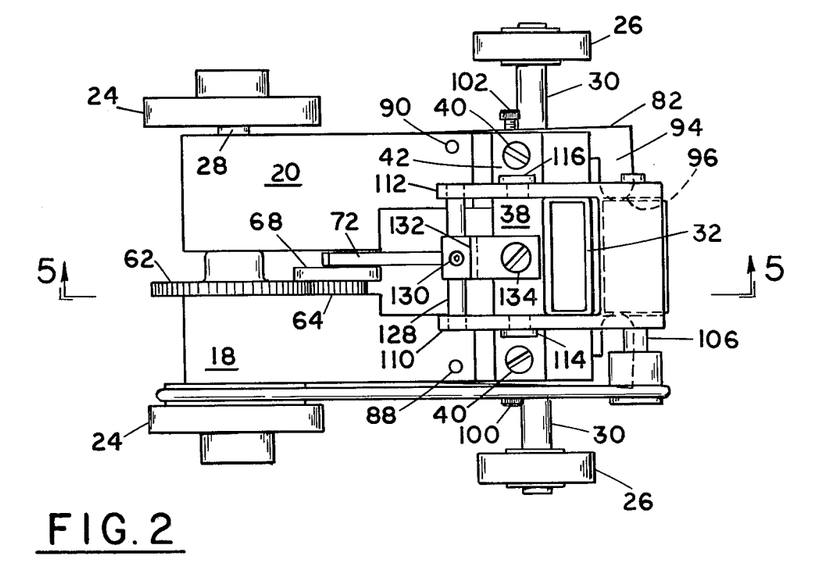
FIG. 2 is a plan view of the device shown in FIG. 1.

Accordingly, as best seen in FIGS. 1, 2 and 5, the ejector actuating means comprises a gear 62 fixedly mounted on the axle 28 for rotation therewith. A much smaller gear 64 is mounted for rotation on a stub shaft 66 which is mounted in the body member half 18, and a disc 68 carrying an eccentric pin 70 is also mounted on the stub shaft 66 for rotation with the gear 64. A lever 72 is connected to the pin 70, as best seen in FIG. 2, by being confined between the outer face of the disc 68 and the inner face of the body member half 20 so that as the disc 68 rotates the pin 70 will cause the lever 72 to reciprocate. The other end of the lever 72 is connected to the ejector block 50 (FIG. 5) by means of a pin 74, the lever 72 extending into a slot formed in the ejector 50 for this purpose. Thus it will be seen that as the device 10 is moved across the surface 14, the wheels 24 are caused to rotate which in turn rotates the axle 28, the gear 62, the gear 64 and the disc 68 carrying the pin 70. Rotation of the pin 70 in an orbiting path causes the lever 72 to reciprocate back and forth which in turn causes the ejector to reciprocate in a linear path determined by the grooves 58 and 60.

In order to assure complete stability of the objects 12 as they are being dispensed successively from the device 10, both side and top guide means are provided which contact the objects 12 as they are being dispensed and which cooperate with the ejecting assembly to cause the objects to be stabilized on the supporting surface in a stationary position thereon before the device moves away from the objects so that the objects remain upright and properly aligned with each other.

The side guide comprises a pair of arms 80 and 82 (FIG. 1) which are received in grooves 84 and 86 formed in the outer surface of the body member halves 18 and 20 respectively. The arms 80 and 82 are secured in their respective grooves 84 and 86 by means of pins 88 and 90 (FIG. 2) mounted in the body member halves 18 and 20 respectively and about which the arms can pivot to a limited extent. The arms 80 and 82 have inwardly extending portions 92 and 94 which terminate inwardly in substantially rounded guiding surfaces 96 and 98 respectively, which surfaces are intended to contact and slide along the outer edges of the objects 12 as they are dispensed. Any suitable biasing means, such as springs (not shown) mounted behind the forward end of the arms 80 and 82, is provided to urge the arms to pivot about the mounting pins 88 and 90 in a direction to cause the portions 92 and 94 to move toward each other. The arms 80 and 82 are provided with adjustment screws 100 and 102 (FIG. 2) in order to set the minimum spacing between the guiding surfaces 96 and 98 by having the inner ends of the adjustment screws abut the inner face of each groove 84 and 86. By setting this spacing just slightly less than the width of an object 12, the object will be held firmly in lateral alignment by the guiding surfaces being urged against the sides of the objects in sliding contact while the objects are being dispensed or ejected from the discharge chamber by the ejector 50.

Another guide means cooperates with the upper surface of the objects 12, and comprises a roller 104 made of sponge rubber or other suitable compressible material, the roller 104 being fixedly mounted on a shaft 106 which is rotatably carried in a generally U-shaped bracket 108 having depending side walls 110 and 112 in which the shaft 106 is rotatably mounted. The bracket 108 is mounted on the body member by the side walls 110 and 112 being secured to the block 38 as by the screws 114 and 116. A pulley 118 is fixedly mounted on an extension of the shaft 106 and is driven by a belt 120 which in turn is driven by a pulley 122 which may be formed integrally with the wheel 24 or separately mounted on the axle 28. Thus as the device 10 moves over the surface 14, the belt 120 rotates the pulley 118 which in turn rotates the shaft 106 and the guide roller 104. The diameters of the pulleys 122 and 118 and the roller 104 have been selected such that the linear surface speed of the roller 104 is zero relative to the supporting surface 14 and to the upper surface of the object 12 so that the roller 104 rolls over the upper surface of the object 12 as the latter is being dispensed, thereby stabilizing the object on the supporting surface in a stationary position before the device 10 moves away from the object so that it remains upright.

The roller 104 is biased into engagement with the top surface of the objects 12 by virture both of the resilient material from which the roller 104 is made and also by an adjustment feature built into the bracket 108. The bracket 108 is pivotally mounted by the screws 114 and 116 and is biased to urge the roller 104 downwardly. This is accomplished by providing a leaf spring 134 (FIG. 3) secured to the block 38 as by the screws 126, the leaf spring pressing against a bar 128 which is supported by the sides 110 and 112 of the bracket 108 and thereby pivot the bracket 108 to lower the roller 104. The lowermost position of the roller 104 can be preset by an adjustment screw 130 against which the bar 128 presses, the screw 130 being mounted in a suitable bracket 132 which is secured to the block 38 as by the screw 134.

Figure 3:
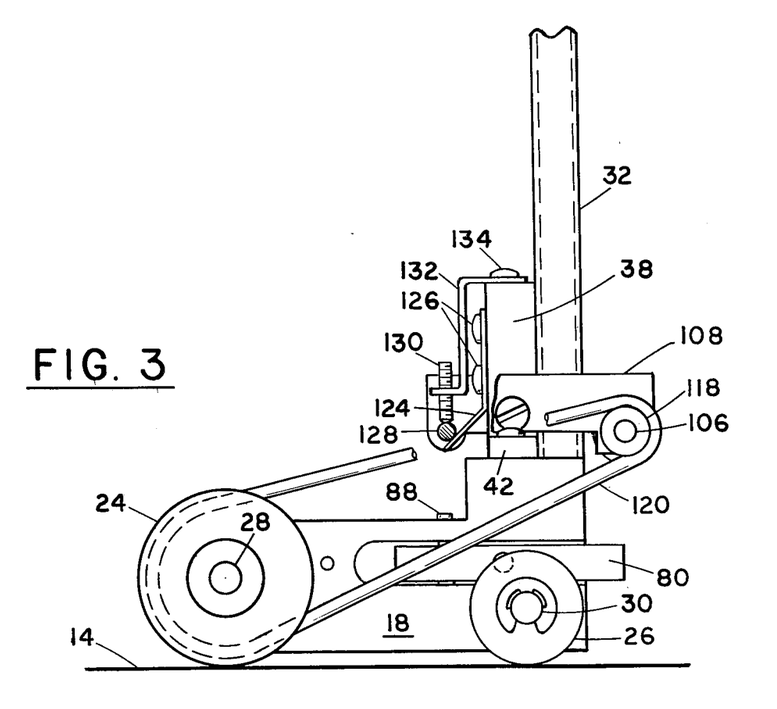
FIG. 3 is a side view of the device shown in FIG. 1.

It should be noted from FIGS. 2, 3 and 5 that the bracket 108 extends rearwardly of the body member a sufficient distance so that the shaft 106 of the roller 104 is mounted in the bracket 108 substantially in alignment with the outer edge of the portions 92 and 94 of the arms 80 and 82. Thus, the object is pinched between the roller 104 and the supporting surface 14 thereby effectively removing the object 12 from the grasp of the guide surfaces 96 and 98. The reason for this is to assure that the roller 104 continues to press on the object 12 being dispensed until after the object has passed beyond the guide surfaces 96 and 98 of the arms 80 and 82 respectively. Since the roller 104 is made of a resilient material, it will stabilize the object 12 very effectively so long as it contacts the object.

From the foregoing description, the mode of operation of the device should be apparent, and only the major operational aspects will be described. As the device 10 is pushed or otherwise moved (it could, for example, be motorized) across a surface, the wheels 24 and axle 28 rotate and this drives the gears 62 and 64, the disc 68, the pin 70 and the lever 72 to cause the ejector 50 to reciprocate back and forth in the manner described above. Rotation of the wheel 24 also drives the belt 120 and the pulley 118 to rotate the guide roller 104. Each time that the ejector reaches the forwardmost end of its stroke, the bottom object 54 in the supply hopper falls into the discharge chamber. The stroke of the ejector 50 is such that it just barely clears the object and therefore is substantially in contact with the object 54 when it falls into the discharge chamber. Since the discharge chamber has no bottom in the embodiment of the invention presently being described, the object 54 actually falls directly onto the supporting surface 14 when it drops into the discharge chamber. Therefore it is inportant that the ejector 50 begin to push on the object as soon as possible after it falls so that the moving device 10 drags the object 54 across the surface 14 as little as possible. This aspect of operation is discussed again below in connection with two other embodiments of the invention, one in which the discharge chamber is provided with a floor, and the other in which the ejector means moves in the ejecting direction with a uniform linear speed which is equal to the linear speed of the device 10.

What actually happens at this point is that the ejector 50, the side guide surfaces 96 and 98 and the top guide roller 104 all cooperate to eject the object 54 from the discharge chamber and to deposit it in a substantially stationary position as the device 10 moves away from the position where the object 54 fell into the discharge chamber. This will occur by virtue of the fact that the ejector 50 moves rearwardly of the device 10 at an average velocity close to that at which the device 10 is moving forwardly, and brings the object under the influence of the guide roller 104 which stabilizes the object in the manner described above before the device 10 moves away from the object.

Figure 6:
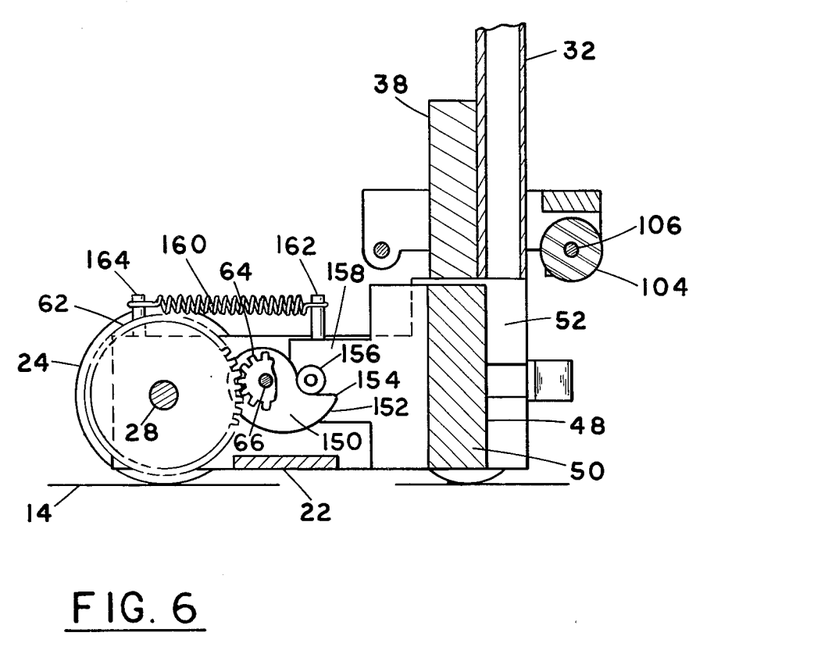
FIG. 6 is a view similar to FIG. 5 showing another embodiment of the invention in the details of the drive connection for the ejector means.

In another embodiment of the invention shown in FIG. 6, the drive connection between the axle 28 and the ejector 50 is constructed such that the ejector 50, when traveling in the ejecting direction through the discharge chamber, is moving with a linear speed equal to that of the device 10 across the supporting surface 14 in the opposite direction with the result that the ejector 50 has an effective velocity of zero with respect to the supporting surface. Therefore, the object being dispensed also has a zero velocity with respect to the supporting surface 14 as soon as it drops into the discharge chamber. This will tend to stabilize the object somewhat before it comes under the influence of the guide roller 104.

Referring to FIG. 6, the axle 28, wheels 24, gear 62, gear 64 and stub shaft 66 are assembled in the same manner as the corresponding parts seen in FIG. 5. However, instead of the disc 68, a cam member 150 is secured to the gear 66 for rotation therewith, the cam member having a cam surface or lobe 152 which increases in radius over a substantial portion of the cam member to a point 154 at which the cam surface 152 extends sharply inwardly. A cam follower 156 is suitably secured to an extension 158 of the ejector 50. A tension spring 160 is connected between a pin 162 also mounted on the extension 158 of the ejector 50 and another pin 164 mounted on one of the body member halves 18 or 20.

In the operation of this embodiment of the invention, the curvature of the cam surface 152 is selected such that, as the cam member 150 rotates in a counter-clockwise direction as viewed in FIG. 6, the cam follower 156 is moved toward the right relative to the device 10 at the same velocity as that at which the device 10 is moving toward the left across the surface 14. Thus, the cam follower is moving, in effect, at a zero velocity relative to the supporting surface 14. Since the cam follower 156 is connected to the ejector 50, the ejector also moves through the discharge chamber at the same velocity with the result that the object being dispensed does not move relative to the supporting surface 14 from the moment it contacts the surface 14 after dropping into the discharge chamber from the supply hopper. When the cam member rotates to bring the cam follower past the point 154, the spring 160 pulls the ejector back to its normal or withdrawn position to allow a subsequent object to drop into the discharge chamber, and the dispensing cycle starts again.

In another embodiment of the invention which is shown in FIG. 5, the device 10 is provided with a strip 140 of thin, flexible metal which is suitably secured to the underside of the body member or the connecting bar 22 as is shown in FIG. 5, the strip 140 extending rearwardly and being bent slightly downwardly to form a floor or bottom wall 142 for the discharge chamber 52. The portion 142 of the strip 140 defining the floor for the discharge chamber lies substantially on the surface 14, or at least would do so under the weight of an object. In the course of developing the present invention, it was originally thought that the floor 142 would help to further stabilize the object being dispensed by providing a moving support for the object during the short interval from the time the object fell into the discharge chamber until the ejector moved into contact with the object and began to discharge it, during which interval the object would be dragged across the surface 14 without the floor 142. However, it was found that the ejector and the activating assembly therefore could be designed with sufficiently close tolerances that, as briefly mentioned above, the ejector began to push on the object almost instantly after the object dropped into the discharge chamber, with the result that the object is not dragged appreciably and the device works as well without the floor 142 as it does with the floor. In some other form of construction where there is any appreciable delay by the actuator is contacting an object after it falls into the discharge chamber, the floor 142 would probably be desirable if not even necessary.

We claim:
1. A device for dispensing and positioning a plurality of rectangular objects such as dominos or the like on a flat surface in evenly spaced relationship, said device comprising:
   A. a body member,
   B. means supporting said body member for movement along a surface on which the objects are to be placed,

C. a supply hopper mounted on said body member for holding a plurality of objects therein to be dispensed, D. a discharge chamber in said body member having an upper portion thereof in communication with said supply hopper such that objects can move successively from said supply hopper to said discharge chamber and a lower portion disposed in close adjacent relationship with the surface along which said body member moves, said discharge chamber having a rearwardly facing opening large enough for an object being dispensed to pass through in the same orientation in which it is received in said discharge chamber.

E. ejector means mounted in said body member for reciprocatory movement through said discharge chamber such that said ejector means discharges an object in said discharge chamber through said rearwardly facing opening, said ejector means being shaped with respect to said discharge chamber so as to obstruct the passage of an object into said discharge chamber while said ejector means is moving through said discharge chamber, and F. means responsive to movement of said body member along said surface for actuating said ejector means in said reciprocatory movement whereby objects are successively dispensed and positioned on said surface in the same orientation in which they are received into and discharged from said discharge chamber.

2. A device as set forth in claim 1 wherein said ejector means comprises a block slidably mounted in said body member and dimensioned approximately corresponding to the size of the object being dispensed so that said ejector contacts substantially the whole of one side of said objects.

3. A device as set forth in claim 1 further including side guide means and top guide means for contacting an object being dispensed to stabilize said object and to prevent it from being knocked over.

4. A device as set forth in claim 1 wherein said means for actuating said ejector means includes means for causing said ejector means to move in one direction with a substantially zero velocity relative to the surface on which said device is moving.

5. A device for dispensing and and positioning a plurality of rectangular objects such as dominos or the like on a flat surface in evenly spaced relationship, said device comprising:

A. a body member,
B. a plurality of wheels mounted on said body member for supporting said body member for movement along a surface on which objects are to be dispensed,
C. an elongate supply hopper mounted on and projecting upwardly from said body member for holding a plurality of objects therein,
D. a discharge chamber in said body member directly beneath said supply hopper, said supply hopper and said discharge chamber being in communication with each other such that objects can move successively from said supply hopper to said discharge chamber under the influence of gravity, said discharge chamber having a lower portion disposed in close adjacent relationship with the surface along which said body member moves, said discharge chamber having a rearwardly facing opening large enough for an object being dispensed to pass through in the same orientation in which it is received in said discharge chamber, E. ejector means mounted in said body member for reciprocatory movement through said discharge chamber such that said ejector means discharges an object in said discharge chamber through said rearwardly facing opening, said ejector means being shaped with respect to said discharge chamber so as to obstruct the passage of an object into said discharge chamber while said ejector means is moving through said discharge chamber, and F. means responsive to movement of one of said wheels for actuating said ejector means in said reciprocatory movement whereby objects are successively dispensed and positioned on said surface in evenly spaced relationship in the same orientation in which they are received into and discharged from said discharge chamber.

6. A device as set forth in claim 5 wherein said ejector means comprises a block slidably mounted in said body member and having a face which is dimensioned longitudinally and laterally approximately corresponding to the longitudinal and lateral dimensions of an object being dispensed so that said ejector contacts substantially the entire face of said object.

7. A device as set forth in claim 6 wherein said block has a pair of lateral extensions and said body member has a pair of grooves which receive said lateral extensions for guiding said block in a linear reciprocatory movement within said body member.

8. A device as set forth in claim 5 further including side guide means and top guide means for contacting an object being dispensed to stabilize said object while it is being dispensed from said device, each of said side and top guide means being mounted on said body member for movement and including means biasing said side and top guide means into engagement with an object while it is being dispensed from said device by said ejector means.

9. A device as set forth in claim 8 wherein said side guide means comprises a pair of arms pivotally mounted on said body member adjacent said discharge chamber with each arm having a free end portion which projects into said discharge chamber and contacts the side edges of an object being dispensed under the influence of said biasing means.

10. A device as set forth in claim 8 wherein said top guide means comprises a roller formed of a compressible material and being rotatably mounted on a bracket which is pivotally mounted on said body member adjacent said discharge chamber in a position such that said roller projects downwardly into the path of an object being dispensed from said discharge chamber so that said roller rolls over the top edge of said object and presses said object firmly downwardly and stabilizes said object while it is being dispensed.

11. A device as set forth in claim 10 wherein said roller is mounted on said bracket sufficiently rearwardly of said body member such that said roller presses downwardly on the upper edge of said object after said object has been completely ejected from said discharge chamber and is beyond the grasp of said side guide means.

12. A device as set forth in claim 10 further including means responsive to rotation of one of said wheels for rotating said roller, said means being constructed and arranged such that said roller is caused to rotate with a linear surface speed which is equal to the speed at which the device moves across said supporting surface in a direction opposite to the direction of rotation of said roller.

13. A device as set forth in claim 5 wherein said means for actuating said ejector means includes means for causing said ejector means to move in one direction of movement through said discharge chamber with a substantially zero velocity relative to the surface on which said device is moving while said device is moving in a direction opposite to said one direction.

14. A device as set forth in claim 5 wherein said means for actuating said ejector means comprises a driving connection between one of said wheels and said ejector means, said driving connection including means responsive to rotation of said one of said wheels for causing said ejector means to move through said discharge chamber in a discharging direction of movement with a linear velocity which is substantially equal to the velocity at which said device is moving across the surface in a direction of movement opposite to the discharging direction of movement of said ejector means so that said ejector means moves in said discharging direction with a zero velocity relative to said surface.

* * * * *